United States Patent [19]

Baty et al.

[11] Patent Number: 5,243,704
[45] Date of Patent: Sep. 7, 1993

[54] OPTIMIZED INTERCONNECT NETWORKS

[75] Inventors: Kurt F. Baty, Medway; Charles J. Horvath, Jr., Boston; Richard C. Clemson, Newton; Scott J. Bleiweiss, Wrentham; Kenneth T. Wolff, Harvard, all of Mass.

[73] Assignee: Stratus Computer, Marlboro, Mass.

[21] Appl. No.: 884,257

[22] Filed: May 8, 1992

Related U.S. Application Data

[63] Continuation of Ser. No. 354,139, May 19, 1989, abandoned.

[51] Int. Cl.$^5$ .............................................. G06F 13/40
[52] U.S. Cl. ............................ 395/325; 364/DIG. 1; 364/229; 364/229.5; 364/240.2
[58] Field of Search ......................... 395/325, 800, 200

[56] References Cited

U.S. PATENT DOCUMENTS

| | | | |
|---|---|---|---|
| 3,641,505 | 2/1972 | Artz et al. | 340/172 |
| 4,032,893 | 6/1977 | Moran | 340/166 |
| 4,112,488 | 9/1978 | Smith, III | 395/200 |
| 4,434,463 | 2/1984 | Quinquis et al. | 395/200 |
| 4,630,193 | 12/1986 | Kris | 395/325 |
| 4,805,091 | 2/1989 | Thiel et al. | 395/800 |
| 4,942,517 | 7/1990 | Cok | 364/200 |
| 4,985,830 | 1/1991 | Atac et al. | 395/200 |

FOREIGN PATENT DOCUMENTS 0301499 7/1988 European Pat. Off. .
2064839A 11/1980 United Kingdom .

OTHER PUBLICATIONS

"Multiprocessor Organization—A Survey", P. H. Enslow, Jr., Computing Surveys, vol. 9, No. 1, Mar. 1977, pp. 103-129.
"Multiprocessor System Organization", M. M. Mano, Computer System Architecture, Prentice-Hall, 1982, pp. 454-473.
Combinatorial Theory, M. Hall, Jr., John Wiley & Sons, 1986, Chapters 1, 10 and 15.
"On the Construction of Balanced Incomplete Block Design", R. C. Bose, Annals of Eugenics, 1939, pp. 353-399.
"A Closed-Form Solution for the Performance . . . ", Irani et al., IEEE Transactions on Computers, vol. c-33, No. 11, Nov. 1984, pp. 1004-1012.
"Communication Performance in Multiple-Bus Systems", Yang et al., IEEE Transactions on Computers, vol. 37, No. 7, Jul. 1988, pp. 848-853.
"A New Class of Fault-Tolerant Static Interconnection . . . ", Skillicorn, IEEE Transactions on Computers, vol. 37, No. 11, Nov. 1988, pp. 1468-1470.
"Fault-Tolerant Multiprocessor Link and Bus Network Architectures", Pradhan, IEEE Transactions on Computers, vol. 34, No. 1, Jan. 1985, pp. 33-45.
Computer, vol. 14, No. 12, Dec. 1981, pp. 8-75.
Computer, vol. 20, No. 6, Jun. 1987, pp. 9-73.
"SIMD and MIMD Processing in the Texas Reconfigurable Array Computer", G. Jack Lipovski, Oct. 1988, Chicago, U.S., pp. 268-269.

Primary Examiner—Debra A. Chun
Attorney, Agent, or Firm—Lahive & Cockfield

[57] ABSTRACT

A multinodal system is one-way interconnected, two-way interconnected or, more generally, (n)-way interconnected, where (n) is an integer. In a one-way interconnected system, only one connection element couples any two nodes. Or, put another way, only one communication path exists between every node and every other node. A two-way interconnected system, on the other hand, has two connection elements coupling each pair of nodes. Likewise, an (n)-way interconnected system provides (n) independent connection paths between each pair. Such systems are characteristic in that the relationship between the number of independent buses (b), the number of nodes (v), the number of ports (r), and the degree of interconnectedness (n) can be expressed by the equation $$b = \frac{r \times v}{\frac{n \times (v-1)}{r} + 1}$$

Two-way and (n)-way interconnect arrays may be adapted for use in fault-tolerant communications.

40 Claims, 4 Drawing Sheets

OPTIMIZED INTERCONNECT NETWORKS

This is a continuation of copending application Ser. No. 07/354,139 filed on May 19, 1989, now abandoned.

BACKGROUND OF THE INVENTION

This invention relates to interconnection networks and, more particularly, networks providing optimized communication pathways in multinodal systems. The invention has application, by way of example, in bus structures of multiprocessor digital data processing systems.

The art discloses a number of structures for connecting elements within multinodal systems. A wide variety of such arrangements are used in the digital data processing field, where designers have gone to great lengths to devise mechanism for coupling system functional units, e.g., central processors, memories and input/output controllers, to achieve maximum throughput and other desired characteristics.

One prior art approach, the so-called multiport system, utilizes separate buses to connect individual shared memory units and multiple processing units. In a multiport system having four processors and four memory units, for example, every processor has its own dedicated bus. Each of these buses is connected to the individual memory units. Interface modules having four ports are provided on the memory units to oversee communications between them and the processors and, particularly, to control which processor has access to the associated memory at any given moment.

In prior art crossbar systems, a switching array is interposed between functional units to establish temporary communication paths. Nodes within the system, e.g., the central processing units, peripheral control units, and memory modules, have their own dedicated buses which are interconnected in the form of a grid with switches at each intersection. These switches respond to command and address signal received from the nodes to open communication paths formed on a transaction-by-transaction basis. Once a transaction is completed, its pathway is closed, leaving that portion of the grid accessible by the other units.

The "common bus" system employs a single system bus to handle communications between multiple nodes. A multiprocessor system having a plurality of central processors sharing a single memory module, for example, permits only one processor at a time to transfer information with the memory module. Other processors requiring access to the memory unit wait their turn and arbitrate for the bus before proceeding. The related dual-bus system utilizes a main system bus to connect a set of local common bus-type systems. A controller unit interfaces each local network to the main bus, transferring signals between them as required.

These prior art approaches have a number of drawbacks. The multiport and crossbar networks, although offering a high transmission bandwidth, become unduly complex and costly as the number of nodes increase. The common-bus and dual-bus systems, while less hardware intensive, form bottlenecks at their shared resources, e.g., the main system bus and memory and, therefore, have relatively narrow transmission bandwidths.

In view of the foregoing, an object of this invention is to provide an improved system for connecting processing elements of a multinodal system. Another object of the invention is to provide an improved structure for linking multiple nodes of computing and signal processing systems. A further object is to provide a multinodal computing and signal processing system which maximizes communication bandwidth and minimizes hardware cost and complexity. Still another object is to provide an improved bus structure for a digital data processing system.

SUMMARY OF THE INVENTION

These objects are attained by the invention, which provides in one aspect, a multinodal system having a plurality of nodes for performing operations. The system may be, for instance, a multiprocessing digital data processor with nodes, e.g., central processing units, peripheral controllers and memory units, which perform calculations, execute system control functions, communicate with peripheral devices, store and retrieve data.

The nodes are connected to one another over a plurality of individual connection elements, e.g., bus lines, which provide an independent pathway for handling communications between the nodes.

The connection elements are configured in a sparse interconnect array so that every node in the system can communicate directly with every other node over a dedicated, independent connection element and so that no one of the connection elements connects all the nodes together.

Thus, for example, in a multiprocessor system constructed in accord with the invention, seven independent bus lines interconnect seven processing nodes in a configuration arranged so that each bus line directly connects only four nodes, and so that every node can communicate directly with every other node through each of two direct bus lines.

Every node of a multinodal system constructed in accord with the invention has a set of ports that couples, or interfaces, the node with its associated connection elements. In a data processing environment, for example, these ports transfer digital signals between a functional unit and its associated bus lines. To illustrate, each node of an exemplary multiprocessor having seven independent buses and seven nodes has four ports coupling that node to its associated buses.

A multinodal system constructed in accord with the invention may be one-way interconnected, two-way interconnected or, more generally, (n)-way interconnected, where (n) is an integer. In a one-way interconnected system, only one connection element couples any two nodes. Or, put another way, only one communication path exists between every node and every other node. A two-way interconnected system, on the other hand, has two connection elements coupling each pair of nodes. Likewise, an (n)-way interconnected system provides (n) independent connection paths between each pair. Two-way and (n)-way interconnect arrays may be adapted for use in fault-tolerant communications.

According to a further aspect of the invention, the configuration of connection elements used to interconnect ports may derive from the solution set of mathematical constructs referred to as incomplete balanced block design solutions. That configuration, moreover, can be arranged to optimize communications over the interconnect structure. As applied to computers, for example, the connection elements, or bus lines, can be configured to take port-to-port paths which ensure that each bus is of approximately the same length.

These and other aspects of the invention are evident in the description which follows.

BRIEF DESCRIPTION OF THE DRAWINGS

A more complete understanding of the invention may be obtained by reference to the drawings, in which.

DETAILED DESCRIPTION OF THE ILLUSTRATED EMBODIMENT

Figure 1:
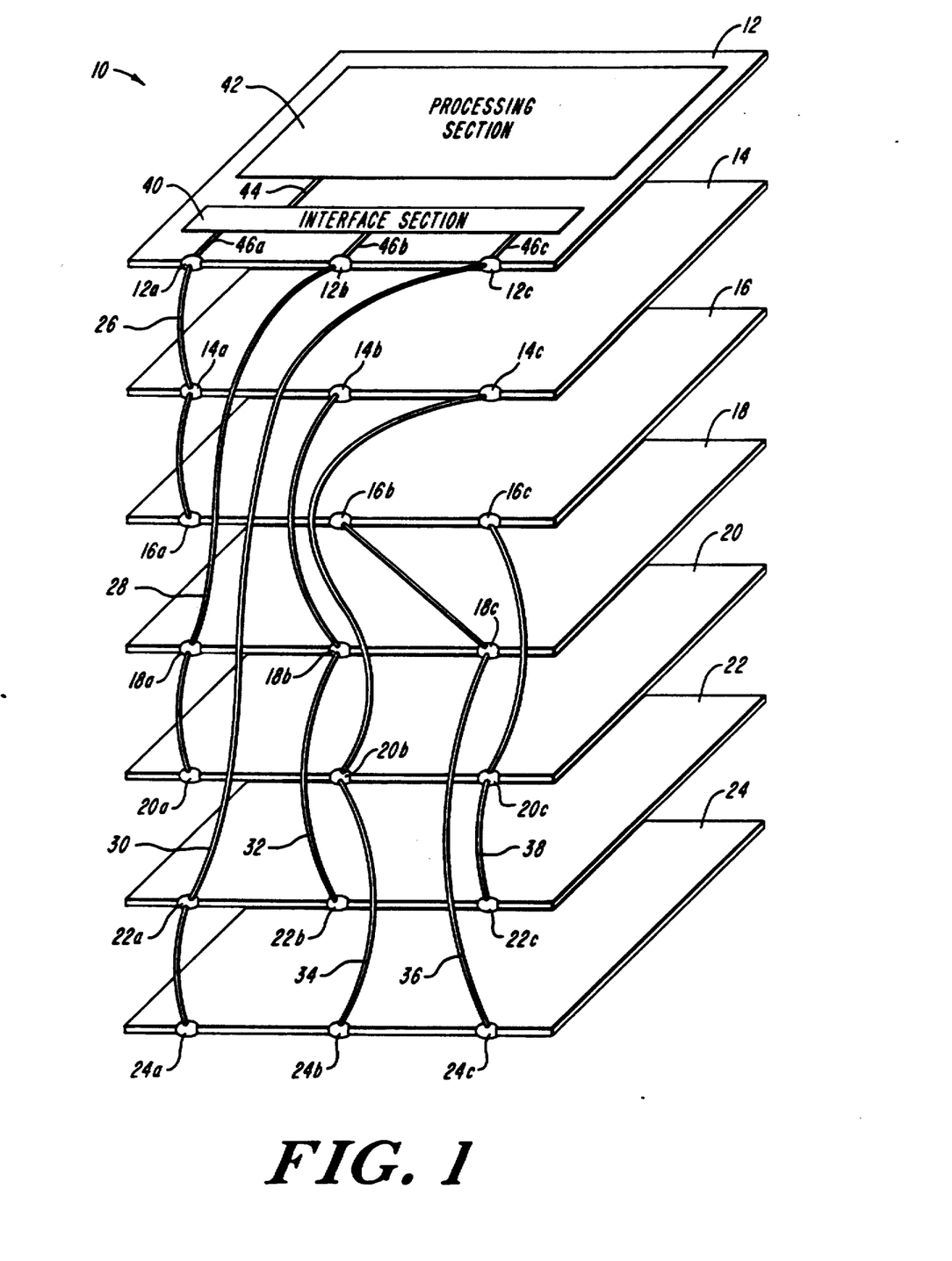
FIG. 1 depicts a one-way interconnect bus array for coupling the nodes of a digital data processing system constructed in accord with the invention.

FIG. 1 depicts a digital data processing system 10 constructed in accord with one aspect of the invention. The illustrated system 10 includes seven nodes 12, 14, 16, 18, 20, 22, 24 coupled to one another by a one-way interconnect structure formed by seven buses 26, 28, 30, 32, 34, 36, 38. The buses connect every node in the system to every other node so that (1) each node is connected with each other node by at least one bus, (2) no single node is connected to all other nodes by a single bus, and (3) at least one of the buses is connected to three or more nodes.

Referring to the drawing, node 12 is connected to nodes 14 and 16 by bus 26, to nodes 18 and 20 by bus 28, and to nodes 22 and 24 by bus 30. Node 14 likewise communicates directly with node 12 and 16 over bus 26, with nodes 18 and 22 over bus 32, and with nodes 20 and 24 over bus 34. Nodes 16-24 are similarly connected by a single communication path to each of the other nodes.

Buses 26, 28, 30, 32, 34, 36, 38 are independent, that is, they are not directly coupled to another. Each bus is thus capable of carrying communications independently of the others and, accordingly, each node can transmit and receive information over any of its associated buses independently of any communications taking place on the other buses. In this regard, the term associated refers to those buses which are connected to a node (e.g., in FIG. 1, buses 26, 28 and 30 are illustrated as being associated with node 12).

Nodes 12-24 have three ports apiece, designated 12a, 12b, 12c, . . . , and 24a, 24b, and 24c, which couple them to their associated buses. Thus, for example, node 12 is connected to bus 26 via port 12, to bus 28 via port 12b, and to bus 30 via port 12c. In a similar manner, the three illustrated ports on each of the other nodes couple them and their associated buses.

The bus configuration shown in FIG. 1 can be represented in tabular form as shown below:

TABLE 1

| Node | Port a | b | c |
| --- | --- | --- | --- |
| A | 1 | 2 | 3 |
| B | 1 | 4 | 5 |
| C | 1 | 6 | 7 |
| D | 2 | 4 | 6 |
| E | 2 | 5 | 7 |
| F | 3 | 4 | 7 |
| G | 3 | 5 | 6 |

In the table, nodes 12-24 are represented by upper case letters "A"-"G," respectively, buses 26-38, by numerical designations "1"-"7"; ports 12a-24a, by the column labelled "a", ports 12b-24b, by the column labelled "b"; and ports 12c-24c, under the column labelled "c."

Referring to Table 1 (and corresponding FIG. 1) the configuration of the sparse bus array is described as follows: bus #1 interconnects nodes A, B and C at each of their respective ports "a" (in the illustration, bus 26 interconnects nodes 12, 14 and 16 via ports 12a, 14a and 16a); bus #2 interconnects nodes A, D and E via ports "b," "a" and "a," respectively (bus 28 interconnects nodes 12, 18 and 20 via ports 12b, 18a and 20a); bus #3 interconnects nodes A, F and G via nodes "c," "a" and "a," respectively (bus 30 interconnects nodes 12, 22 and 24 via ports 12c, 22a and 24a); and so forth.

The illustrated sparse bus array, providing a one-way interconnect for connecting seven nodes, each having three ports, via seven independent buses, is understood to be a member of at least one larger class of related one-way interconnect structures. That class can be characterized, in part, by the relationship between the number of independent buses (b), the number of ports (r), and the number of nodes (v), to wit, $$b = \frac{r \times v}{\frac{(v-1)}{r} + 1} \qquad \text{Eq. 1}$$

Thus, for example, a system constructed in accord with this aspect of the invention may have three ports, seven nodes and seven independent buses; four ports, nine nodes and twelve independent buses, etc.

In one embodiment of the invention, nodes 12-24 represent the functional units of a digital data processing system. Thus, for example, nodes 12, 14 and 16 can represent three central processing units, node 18 can be a network interface, nodes 20 and 22 can be peripheral controllers, and node 24 can be a shared random access memory unit. Signal processing functions performed by each of these nodes 12-24 are handled by a processing logic section in each node. One such section is shown as element 42 in node 12 of FIG. 1. By way of illustration, these logic sections can be constructed and operated in general accord with the teachings of the U.S. Pat. No. 4,654,857 and U.S. patent applications Nos. 927,746, 003,732, 018,629, 079,297, 227,471, which are assigned to the assignee hereof. The teachings of the patents and patent applications are incorporated herein by reference.

In a preferred embodiment, each node 12-24 includes both a central processing unit section and a random access memory unit section. The latter, while primarily associated with the central processing unit in the same node, can also be accessed by the central processing units in the other nodes.

Each node in the illustrated embodiment includes circuitry which serves to interface its processing logic section and ports. Referring to FIG. 1, exemplary node 12 includes interface circuitry 40 providing an interface between logic section 42 and ports 12a, 12b and 12c. The interface circuitry 40 is connected to the processing section by an internal bus line 44 which is multiplexed to carry addressing and data signals, as well as command signals.

During command or data transmission, interface circuitry 40 within the sending node monitors addressing signals generated by its associated processing logic section 42. Those signals determine which port to send the communications from. For example, communications sent by node 12 addressing nodes 14 or 16 are routed by circuitry 40 through port 12a to bus 26, while those addressing nodes 22 or 24 are routed through port 12c to bus 30. Illustrated interface circuitry 40 also continuously monitors the bus lines 26, 28 and 30 to determine whether the information they carry is directed addressed to the associated node 12. If so, the circuitry 40 passes that information on to the processing section 42.

In a preferred embodiment of the invention, logic within each interface section 40 generates a signal which determines the specific output port for communications from the associated node. That logic takes as input signals representative of the node number, or slot identification, of each of the sending unit and the receiving unit.

Simulation models showing the function and interconnection of elements in a developmental system 10 constructed in accord with the invention are provided in appendices filed herewith (not printed). More particularly, Appendix A includes a top level model of the bus network topology; Appendix B includes a model of a processor/memory node interconnected to the bus network; Appendix C includes a model of the ports that interconnect the processor/memory node to the bus network; Appendix D is a model of memory logic used by the processor/memory node to route information from the node to the "correct" port. These simulation models are presented in a mixed-level digital design language marketed under the tradename "Verilog," by Gateway Design Automation Corporation of Westford, Mass. The models are intended to run on a "Verilog" simulator also marketed by Gateway Design Automation Corporation.

Figure 2:
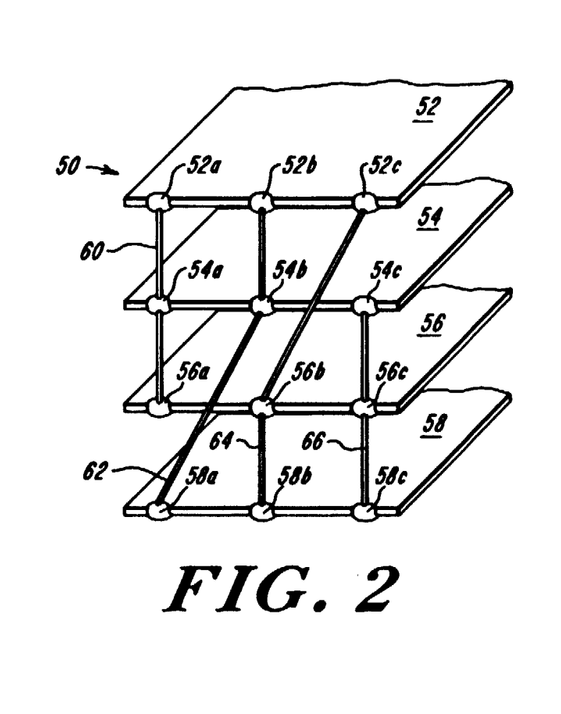
FIG. 2 depicts a sparse bus array providing a two-way interconnect between four nodes of a digital data processing system constructed in accord with the invention.

FIG. 2 depicts a sparse bus array 50 providing a two-way interconnect between nodes of a digital data processing system constructed in accord with the invention. The illustration does not show the internal structure of the nodes, which may be constructed and operated similarly to those discussed above.

Sparse bus array 50 has four nodes 52-58, each with three ports 52a, 52b, 52c, ..., and 58a, 58b, 58c. The nodes 52-58 are interconnected by four buses 60-66 in such a manner that there exist two independent communication paths between each pair of nodes.

As before, the buses of interconnect array 50 are arranged to connect every node to every other node so that (1) each node is connected with each other node by two buses; (2) no single node is connected to all other nodes by a single bus; and (3) at least one of the buses is connected to three of the nodes.

The configuration of buses and ports in structure 50 is presented in tabular form below. As before, the nodes 52-58 are represented by uppercase letters "A"–"D," respectively; ports 52a-58a, ..., and 52d-58d, by columns headed with lowercase letters "a"–"c," respectively; and buses 60-66, by numerals 1-4, respectively.

TABLE 2

| Node | Port a | b | c |
|---|---|---|---|
| A | 1 | 2 | 3 |
| B | 1 | 2 | 4 |
| C | 1 | 3 | 4 |
| D | 2 | 3 | 4 |

Table 2 reflects the configuration of a corresponding system, shown in FIG. 2, in the manner described above. For example, the table reveals that bus #1 interconnects nodes A, B and C via their respective ports "a" or, alternatively, the corresponding structure in FIG. 2 shows that bus 60 interconnects nodes 52-56, via ports 52a-56a.

The illustrated embodiment is understood to be a member of at least one larger class of related two-way interconnect structures. That known class may also be characterized, in part, by the relationship between the number of independent buses (b), the number of nodes (v), and the number of ports (r), to wit, $$b = \frac{r \times v}{\frac{2(v-1)}{r} + 1} \qquad \text{Eq. 2}$$

Thus, for example, a system constructed in accord with this aspect of the invention may have three ports, four nodes, and four independent buses; four ports, seven nodes, and seven independent buses; five ports and eleven independent buses.

More generally, the systems constructed in accord with this aspect of the invention are characteristic in that the relationship between the number of independent buses (b), the number of nodes (v), the number of ports (r), and the degree of interconnectedness (n) can be expressed by the equation $$b = \frac{r \times v}{\frac{n \times (v-1)}{r} + 1} \qquad \text{Eq. 3}$$

For a one-way interconnect system, (n) is one; for a two-way system, (n) is two; and so forth.

While, the smaller interconnect structures shown in FIGS. 1 and 2, and reflected in Tables 1 and 2, can be designed "by hand," or on computer, by trial-and-error, it has been found that the results of studies conducted in a branch of mathematics known as combinatorial theory and, particularly, the field of block designs can be used to derive more rapidly configurations for the larger interconnect structures.

The block design studies are understood to provide specific solutions to problems of arranging (v) distinct objects into (b) blocks such that each block contains exactly (k) distinct objects, each occurring in exactly (r) different blocks, and every pair of distinct objects occurs together in exactly (n) blocks. Sets of those solutions, referred to as "balanced incomplete block designs," are disclosed in Bose, "On the Construction of Balanced Incomplete Block Designs,", *Annals of Eugenics*, (1939) and Hall, Jr., *Combinatorial Theory* (2nd ed., 1986). Those skilled in the art will appreciate that solutions for all values of (b), (r) and (v) otherwise meeting the constraints of Eqs. (1), (2) and (3) are not presently known.

In applying these block design solutions to interconnect array configurations, it has been ascertained that the parameter (v) is to be treated as the number of nodes; the parameter (k), as the number of loads per bus (i.e., the number of nodes to which each bus is attached); the parameter (b), as the number of buses; and the parameter (r), as the number of ports. As indicated above, (n) is to be treated as the degree of interconnectedness.

A subset of the aforementioned solutions are referred to as symmetric and satisfy the additional constraint that v=b and k=r. For that subset, Eqs (1)–(3), above, are expressed, respectively, as follows:

$$b = (r \times (r - 1)) + 1 \quad \text{Eq. 4}$$
$$b = (r \times (r - 1)/2) + 1 \quad \text{Eq. 5}$$
$$b = (r \times (r - 1)/n) + 1 \quad \text{Eq. 6}$$

By way of example, Hall, Jr. teaches a symmetric solution for (k)=4, (v)=7 and (n)=2. That solution, referred to as a biplane, is written as follows:

TABLE 3

| 3 | 5 | 6 | 7 |
| 4 | 6 | 7 | 1 |
| 5 | 7 | 1 | 2 |
| 6 | 1 | 2 | 3 |
| 7 | 2 | 3 | 4 |
| 1 | 3 | 4 | 5 |
| 2 | 4 | 5 | 6 |

This teaching can be applied to the practice of the invention to derive, for example, a sparse two-way interconnect structure by designating the columns of this matrix as ports, "a" through "d," the rows as nodes, "A" through "G," and the numerical entries themselves as bus lines "1" through "7" to produce the following interconnect table:

TABLE 4

| Node | Port | | | |
|---|---|---|---|---|
| | a | b | c | d |
| A | 3 | 5 | 6 | 7 |
| B | 4 | 6 | 7 | 1 |
| C | 5 | 7 | 1 | 2 |
| D | 6 | 1 | 2 | 3 |
| E | 7 | 2 | 3 | 4 |
| F | 1 | 3 | 4 | 5 |
| G | 2 | 4 | 5 | 6 |

Figure 3:
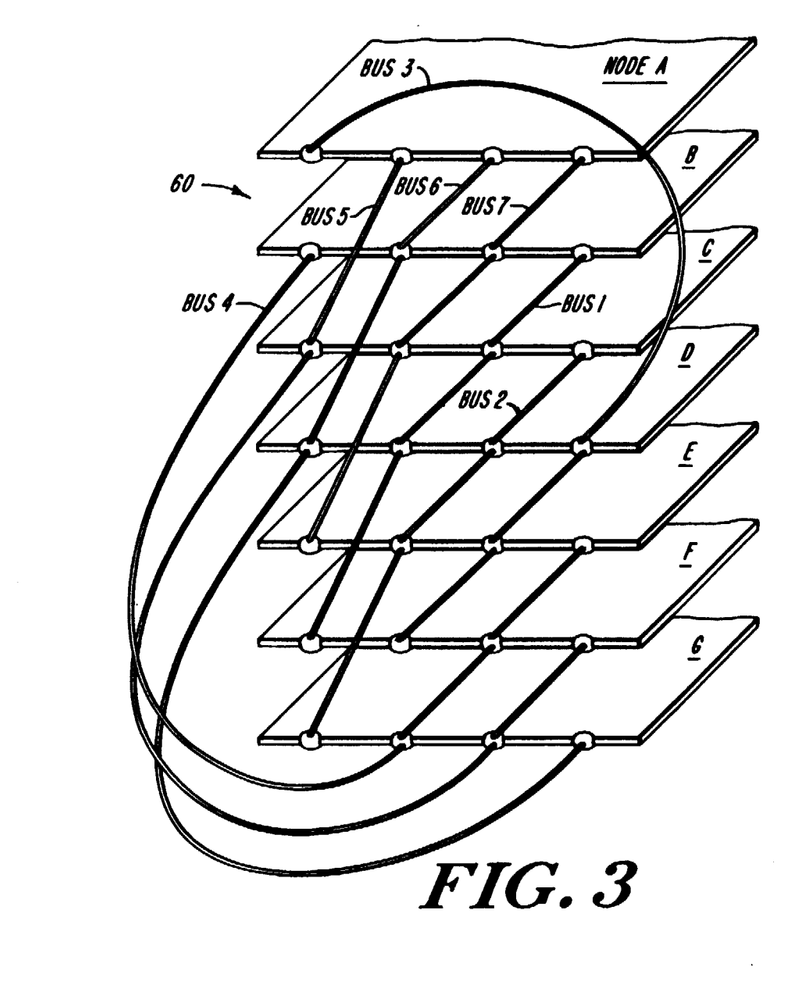
FIG. 3 depicts a sparse bus array providing a two-way interconnect between seven nodes of a digital data processing system constructed in accord with the invention.

Consistent with the discussions above, Table 4 can denote a configuration for an interconnect structure, as shown in FIG. 3.

It will be appreciated that further sparse bus interconnect arrays according to the invention can be similarly derived from other incomplete balanced block design solutions, both symmetric and otherwise.

Communication characteristics of the disclosed interconnect structures can be optimized by rearranging specific port-to-port connections in view of the physical characteristics of the connecting elements. In particular, communications over the sparse bus array shown in FIG. 3 are preferably improved by modifying the array configuration to so that all buses are of substantially equal length.

Such modification can be effected, in one instance, by trial-and-error rearrangement of the ports and buses of a prototype system and, preferably, by interactive switching of the rows and columns of matrices of the type shown in Tables 1, 2 and 4. The bus lengths of the corresponding physical systems, which can be calculated from the actual port and node spacings, are compared to identify the most optimal configuration.

Thus, for example, a computer program can be designed to find optimal equal bus-length configurations by first calculating the lengths of buses required to implement a structure corresponding to Table 4 and retaining the results of that calculation, e.g., the mean bus length and standard deviation, for comparison with the results of similar calculations performed for other configurations. To wit, such a program can exchange column "a" of the table with column "b," and calculate the lengths of buses for the corresponding structure. If more optimal, these new results can be retained in place of the original results. Column "a" can then be exchanged with column "c", a further calculation and comparison performed; and so forth. Using this method, it is understood that there are roughly 120,000 possible combinations to be evaluated to determine the best configuration for a two-way interconnected seven-board, four-node system corresponding to Table 4.

A matrix representing an optimal configuration as determined using the aforementioned method is shown below. The structure corresponding to the matrix is shown in FIG. 4.

TABLE 5

| Node | Port | | | |
|---|---|---|---|---|
| | a | b | c | d |
| A | 1 | 2 | 3 | 4 |
| B | 2 | 4 | 5 | 6 |
| C | 1 | 2 | 5 | 7 |
| D | 2 | 3 | 6 | 7 |
| E | 1 | 3 | 5 | 6 |
| F | 3 | 4 | 5 | 7 |
| G | 1 | 4 | 6 | 7 |

Figure 4:
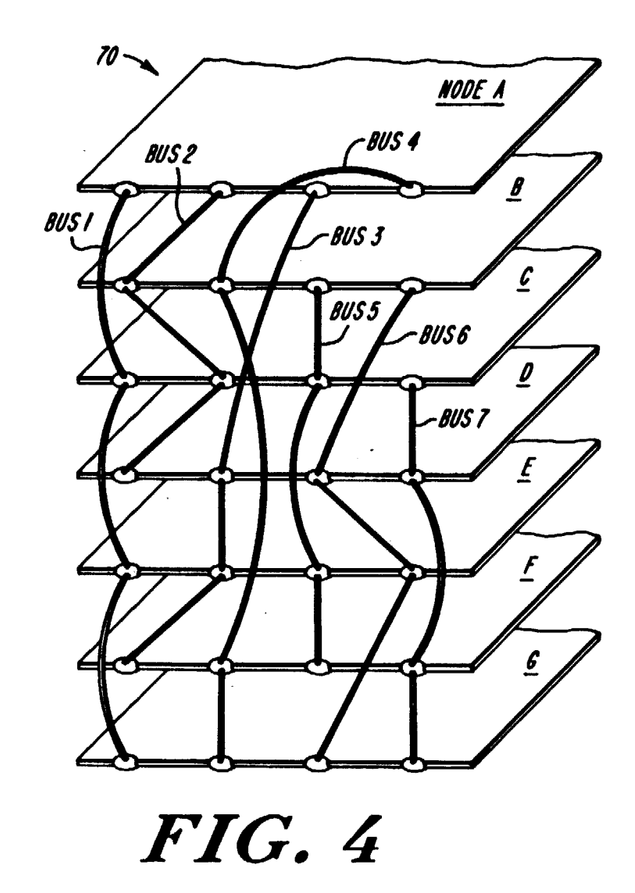
FIG. 4 depicts a preferred configuration of the array shown in FIG. 3 optimized so that the bus lines are of substantially the same length.

Those skilled in the art will appreciate the difficulties inherent in attempting to realize a sparse bus configurations of the type shown in FIG. 4 using buses that have a large number of conductors. In such instances, it is preferred to align and connect individual pins of each port, rather than the ports themselves, in the manner shown in FIG. 4. Those skilled in the art will further realize that the techniques described above can be applied to optimize sparse bus configurations based on any physical characteristics of the underlying connection elements.

The sparse bus interconnect structures shown in the FIGS. 1–4 are fully populated. i.e., that each bus is equally loaded. Thus, for example, the seven nodes of the multiprocessing system depicted in FIG. 1 are coupled via a one-way interconnect structure of seven buses, each supporting four nodes, while the four nodes of the system depicted in FIG. 2 are coupled via a two-way interconnect structure of four buses, each supporting three nodes. Optimization of the transmission characteristics of interconnect structures such as these are not restricted by the transmission limitations of any one bus. Thus, for example, no single bus will suffer capacitative loading limitations before the others.

Those skilled in the art will nevertheless appreciate that these fully populated structures are not the only type that fall within the scope of the invention whose embodiments are described herein. Rather, structures having the characteristics and features of the illustrated embodiments, and including less or more nodes also fall within the scope the invention.

Figure 5:
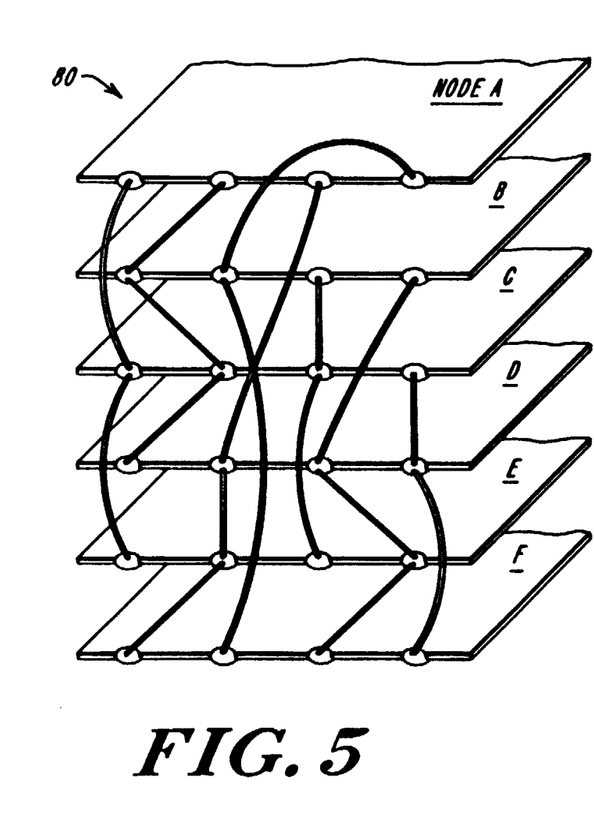
FIG. 5 depicts a digital data processor with a sparse bus array configured similarly to that shown in FIG. 4, but having only six nodes.

FIG. 5 shows one example of such a multinodal system. That system 80, having only six nodes A–F, includes a seven-element interconnect structure similar to that of the seven-node system shown in FIG. 4. Here, however, the illustrated system 80 is configured so that not all of the buses couple corresponding ports of the same number of nodes. The two systems operate identically, except that the interface sections within each node of the system 80 in FIG. 5 are not enabled to permit the routing of communications to the missing seventh node. In practice, the system 80 can be designed to accommodate a seventh node, in which case the nodal interface sections must be reenabled to route communications to the additional node.

Figure 6:
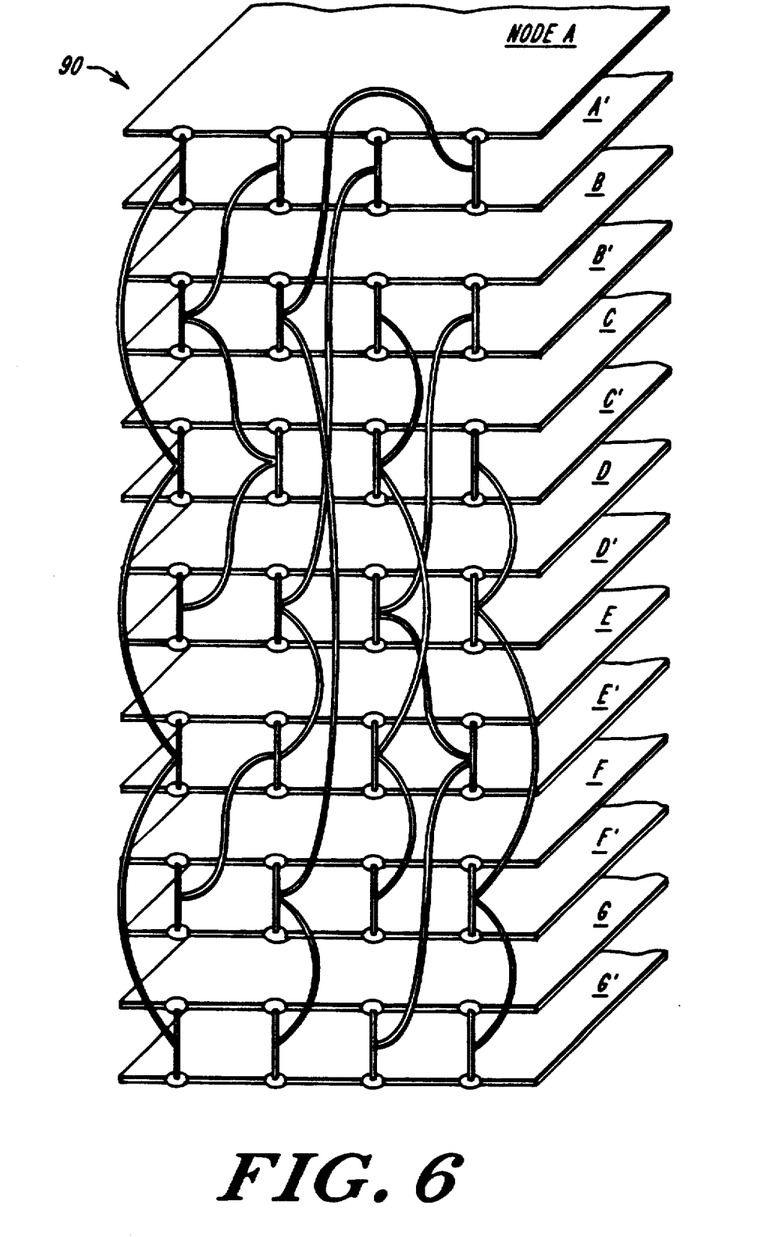
FIG. 6 depicts a digital data processor with redundant functional units having a sparse bus array configured similarly to that of FIG. 4.

Another example is provided in FIG. 6. Here, the interface structure of the system shown in FIG. 4 is applied to a multinodal system 90 having fourteen nodes, double the number presented in that original illustration. FIG. 6 has nodes A, A', B, B', ..., and G, G', which represent paired, redundant functional units constructed in accord with the teachings of aforementioned United States patents and patent applications. Nodes A and A', for example, are coupled to others in the system to receive identical input signals and to operate substantially synchronously and simultaneously to produce identical output signals. Thus, whereas the two-way interconnect structure featured by the systems illustrated in both FIGS. 4 and 6 provide fault-tolerant communication pathways, the system of FIG. 6 additionally provides fault-tolerant processing capabilities.

Those skilled in the art will appreciate that the embodiments described and pictured herein are illustrative only and that other systems employing various combinations of the features described herein may also fall within the spirit and scope of the invention. By way of example: sparse bus systems with more than two degrees of interconnectedness, e.g., three-way and four-way interconnect systems; sparse bus interconnect systems whose configurations are not derived from currently known incomplete balanced design block solutions; and sparse bus interconnect systems optimized to improve communications in ways other than by having substantially identical bus lengths.

In view of the foregoing, what we claim is:

1. In a digital data processing system having (v) nodes, where (v) is an integer greater than or equal to four, each including at least one of central processing means for processing information-representative signals, memory means for storing and/or retrieving information-representative signals, and peripheral controller means for controlling communications with a peripheral device, the improvement for efficiently coupling said nodes for communication with one another via a plurality of independent bus means, comprising A. (b) bus means, each being associated with and coupled to three or more of said nodes for communicating information-representative signals therebetween, independently of communications on each other bus means, said (b) bus means being configured so that i) each node is connected with each respective other node by at least (n) said bus means, ii) no single node is connected to all other nodes by a single bus means, and iii) at least one of said (b) bus means is connected to at least three or more of said nodes, B. each said node having (r) port means, each connected with that node and with one of associated bus means for providing a coupling interface therebetween, and C. where (n) and (r) are positive integers selected such that the mathematical relation $$b = \frac{r \times v}{\frac{n \times (v-1)}{r} + 1}$$

provides a positive integer (b), defining the number of said bus means.

2. In a digital data processing system according to claim 1, the further improvement wherein said (b) bus means connected with said port means in a configuration derived from an incomplete balanced block design.

3. In a digital data processing system according to claim 1, wherein a communication characteristic of information-representative signals on each of said (b) bus means is a function of the length thereof, the further improvement wherein said (b) bus means are of substantially the same length.

4. In a digital data processing system according to claim 1, the further improvement wherein (n) is equal to one.

5. In a digital data processing system according to claim 4, the further improvement wherein each of said bus means is connected with the same number of said port means.

6. In a digital data processing system according to claim 1, the further improvement wherein (n) is equal to two.

7. In a digital data processing system according to claim 6, the further improvement wherein at least one said bus means is connected with a different number of said port means than another of said bus means.

8. In a digital data processing system according to claim 6, the further improvement wherein said (b) bus means are configured so that each node is connected to each other node by at least two said bus means.

9. In a digital data processing system according to claim 8, the further improvement wherein each said node is connected to each other node by exactly two bus means.

10. In a digital data processing system according to claim 6, the further improvement wherein said (b) bus means are of substantially the same length.

11. In a digital data processing system having (v) nodes, where (v) is an integer greater than or equal to four, each including at least one of central processing means for processing information-representative signals, memory means for storing and/or retrieving information-representative signals, and peripheral controller means for controlling communications with a peripheral device, the improvement for efficiently coupling said nodes for communication with one another via a plurality of independent bus means, comprising A. (b) bus means, each being associated with and coupled to three or more of said nodes for communicating information-representative signals therebetween, independently of communications on each other bus means, said (b) bus means being configured so that i) each node is connected with each respective other node by at least (n) said bus means, ii) no single node is connected to all other nodes by a single bus means, and iii) at least one of said (b) bus means is connected to at least three or more of said nodes, B. each said node having (r) port means, each connected with that node and with one of associated bus means for providing a coupling interface therebetween, and C. where (r) is a positive integer, wherein (n) is equal to one, and wherein (r) is selected such that the mathematical relation $$b = r \times (r-1) + 1$$

provides a positive integer (b), defining the number of said bus means.

12. In a digital data processing system according to claim 11, the further improvement wherein each said bus means is connected with the same number of said port means.

13. In a digital data processing system according to claim 11, the further improvement wherein said (b) bus means are connected with said port means in a configuration derived from a symmetric incomplete balanced block design.

14. In a digital data processing system having (v) nodes, where (v) is an integer greater than or equal to four, each including at least one of central processing means for processing information-representative signals, memory means for storing and/or retrieving information-representative signals, and peripheral controller means for controlling communications with a peripheral device, the improvement for efficiently coupling said nodes for communication with one another via a plurality of independent bus means, comprising A. (b) bus means, each being associated with and coupled to three or more of said nodes for communicating information-representative signals therebetween, independently of communications on each other bus means, said (b) bus means being configured so that
  i) each node is connected with each respective other node by at least (n) said bus means,
  ii) no single node is connected to all other nodes by a single bus means, and
  iii) at least one of said (b) bus means is connected to at least three or more of said nodes, B. each said node having (r) port means, each connected with that node and with one of associated bus means for providing a coupling interface therebetween, and C. where (r) is a positive integer, wherein (n) is equal to two, and wherein (n) and (r) are selected such that the mathematical relation $$b = (r \times (r-1)/2) + 1$$

provides a positive integer (b), defining the number of said bus means.

15. In a digital data processing system according to claim 14, the further improvement wherein at least one said bus means is connected with a different number of said port means than another of said bus means.

16. In a digital data processing system according to claim 14, the further improvement wherein said (b) bus means are configured so that each node is connected to each other node by at least two said bus means.

17. In a digital data processing system according to claim 16, the further improvement wherein respective ports of at least two said nodes are coupled to one another and to said bus means so as to receive information-representative signals on said bus means from others of said nodes identically with each other.

18. In a digital data processing system according to claim 14, the further improvement wherein each said node is connected to each other node by exactly two bus means.

19. In a digital data processing system according to claim 14, the further improvement wherein said (b) bus means are connected with said port means in a configuration derived from a symmetric incomplete balanced block design.

20. In a multinodal system having (v) nodes, where (v) is an integer greater than or equal to four, each for performing a selected operation, the improvement for efficiently coupling said nodes for communication with one another via a plurality of independent connection means, comprising:

A. (b) connection means, each being associated with and coupled to three or more of said nodes for placing them in communication, independently of communication on each other connection means, said (b) connection means being configured so that
  i) each node is connected for communication with each other node by at least (n) said connection means,
  ii) no single node is connected for communication to all other nodes by a single connection means, and
  iii) at least one of said (b) connection means is connected to at least three or more of said nodes, B. each said node having (r) port means, each connected with that node and with one of its associated connection means for providing a coupling interface therebetween, and C. where (n) and (r) are positive integers selected such that the mathematical relation $$b = \frac{r \times v}{\frac{n \times (v-1)}{r} + 1}$$

provides a positive integer (b), defining the number of said bus means.

21. A multinodal system according to claim 20, wherein said (b) connection means are connected with said port means in a configuration derived from an incomplete balanced block design.

22. A multinodal system according to claim 21, the further improvement wherein (n) is equal to two and wherein (b) is numerically equal to $(r \times (r-1)/2) + 1$.

23. A multinodal system according to claim 22, the further improvement wherein each said connection means is connected for communication with the same number of said port means.

24. A multinodal system according to claim 22, the further improvement wherein said (b) connection means are configured so that each node is connected for communication to each other node by at least two said connection means.

25. A multinodal system according to claim 24, the further improvement wherein each said node is connected for communication to each other node by exactly two connection means.

26. A multinodal system according to claim 22, the further improvement wherein said (b) connection means are connected with said port means in a configuration derived from a symmetric incomplete balanced block design.

27. A multinodal system according to claim 20, wherein (n) is equal to one.

28. A multinodal system according to claim 27, wherein at least one said connection means is connected with a different number of said port means than another of said connection means.

29. A multinodal system according to claim 20, wherein (n) is equal to two.

30. A multinodal system according to claim 29, wherein each said connection means is connected with the same number of said port means.

31. A multinodal system according to claim 29, wherein said (b) connection means are configured so that each node is connected to each other node by at least two said connection means.

32. A multinodal system according to claim 31, the further improvement wherein respective ports of at least two said nodes are coupled to one another and to said connection means so as to receive communications on said connection means from others of said nodes identically with each other.

33. A multinodal system according to claim 29, wherein each said node is connected to each other node by exactly two connection means.

34. A multinodal system according to claim 20, wherein a communication characteristic of each of said (b) connection means is a function of the length thereof, the improvement wherein said (b) connection means are of substantially the same length.

35. In a multinodal system having (v) nodes, where (v) is an integer greater than or equal to four, each for performing a selected operation, the improvement for efficiently coupling said nodes for communication with one another via a plurality of independent connection means, comprising:
   A. (b) connection means, each being associated with and coupled to three or more of said nodes for placing them in communication, independently of communication on each other connection means, said (b) connection means being configured so that
      i) each node is connected for communication with each other node by at least (n) said connection means,
      ii) no single node is connected for communication to all other nodes by a single connection means, and
      iii) at least one of said (b) connection means is connected to at least three or more of said nodes,
   B. each said node having (r) port means, each connected with that node and with one of its associated connection means for providing a coupling interface therebetween, and
   C. where (r) is a positive integer, wherein (n) is equal to one, and wherein (n) and (r) are selected such that the mathematical relation $$b = r \times (r-1) + 1$$

provides a positive integer (b), defining the number of said bus means.

36. A multinodal system according to claim 35, the further improvement wherein at least one said connection means is connected for communication with a different number of said port means than another said connection means.

37. A multinodal system according to claim 35, the further improvement wherein said (b) connection means are connected with in a configuration derived from a symmetric incomplete balanced block design.

38. A multinodal system according to any of claims 20 or 35, the further improvement wherein
   A. each of said (b) connection means has physical characteristics affecting communication thereon,
   B. said (b) connection means are configured with respect to said physical characteristics so as to optimize communications on said connection means.

39. In a digital data processing system having (v) nodes, where (v) is an integer greater than or equal to four, each including at least one of central processing means for processing information-representative signals, memory means for storing and/or retrieving information-representative signals, and peripheral controller means for controlling communications with a peripheral device, the improvement comprising sparse-connect means for coupling said nodes for communication with one another, said sparse-connect means consisting essentially of
   A. (b) bus means, each being associated with and coupled to three or more of said nodes for communicating information-representative signals therebetween, independently of communications on each other bus means, said (b) bus means being configured so that
      i) each node is connected with each respective other node by (n) bus means,
      ii) no single node is connected to all other nodes by a single bus means, and
      iii) at least one of said (b) bus means is connected to at least three or more of said nodes,
   B. each said node having (r) port means, each connected with that node and with one of associated bus means for providing a coupling interface therebetween, and
   C. where (b), (n) and (r) are positive integers, and where (b) is numerically equal to $$\frac{r \times v}{\frac{n \times (v-1)}{r} + 1}$$

40. In a digital data processing system having (v) nodes, where (v) is an integer greater than or equal to four, each including at least one of central processing means for processing information-representative signals, memory means for storing and/or retrieving information-representative signals, and peripheral controller means for controlling communications with a peripheral device, the improvement comprising sparse-connect means for coupling said nodes for communication with one another, said sparse-connect means consisting of
   A. (b) bus means, each being associated with and coupled to three or more of said nodes for communicating information-representative signals therebetween, independently of communications on each other bus means, said (b) bus means being configured so that
      i) each node is connected with each respective other node by (n) bus means,
      ii) no single node is connected to all other nodes by a single bus means, and
      iii) at least one of said (b) bus means is connected to at least three or more of said nodes, B. each said node having (r) port means, each connected with that node and with one of associated bus means for providing a coupling interface therebetween, and C. where (b), (n) and (r) are positive integers, and where (b) is numerically equal to $$\frac{r \times v}{\frac{n \times (v-1)}{r} + 1}$$

* * * * *